US012805549B2

(12) United States Patent
Kamino et al.

(10) Patent No.: US 12,805,549 B2
(45) Date of Patent: Nov. 24, 2026

(54) METHOD FOR SUPPRESSING FOAMING IN CARBONATED BEVERAGE, METHOD FOR PRODUCING CARBONATED BEVERAGE, CARBONATED BEVERAGE WITH SUPPRESSED FOAMING

(71) Applicant: TAKASAGO INTERNATIONAL CORPORATION, Tokyo (JP)

(72) Inventors: Takuya Kamino, Kanagawa (JP); Yumi Watari, Kanagawa (JP)

(73) Assignee: TAKASAGO INTERNATIONAL CORPORATION, Tokyo (JP)

( * ) Notice: Subject to any disclaimer, the term of this patent is extended or adjusted under 35 U.S.C. 154(b) by 278 days.

(21) Appl. No.: 18/294,732

(22) PCT Filed: Jul. 29, 2022

(86) PCT No.: PCT/JP2022/029387
§ 371 (c)(1),
(2) Date: Feb. 2, 2024

(87) PCT Pub. No.: WO2023/013561
PCT Pub. Date: Feb. 9, 2023

(65) Prior Publication Data
US 2024/0341329 A1 Oct. 17, 2024

(30) Foreign Application Priority Data
Aug. 4, 2021 (JP) ................................ 2021-127898

(51) Int. Cl.
*A23L 2/56* (2006.01)
*A23L 2/54* (2006.01)

(52) U.S. Cl.
CPC .. *A23L 2/56* (2013.01); *A23L 2/54* (2013.01)

(58) Field of Classification Search
CPC .................................... A23L 2/56; A23L 2/54
See application file for complete search history.

(56) References Cited

U.S. PATENT DOCUMENTS

2008/0226795 A1* 9/2008 May ........................ A23L 29/30 426/590
2017/0071231 A1 3/2017 Johnson et al.
(Continued)

FOREIGN PATENT DOCUMENTS

CA 2 656 585 A1 9/2008
CN 101657111 A 2/2010
(Continued)

OTHER PUBLICATIONS

International Search Report (PCT/ISA/210) dated Oct. 3, 2022, issued by International Searching Authority for International Application No. PCT/JP2022/029387.
(Continued)

*Primary Examiner* — Erik Kashnikow
*Assistant Examiner* — Assaf Zilbering
(74) *Attorney, Agent, or Firm* — Sughrue Mion, PLLC

(57) ABSTRACT

A carbonated beverage containing glycerin in an amount of 120 ppm to 1800 ppm is disclosed. A method for producing a carbonated beverage and a method for suppressing foaming in a carbonated beverage are disclosed. The method includes adjusting a concentration of glycerin in a carbonated beverage to 120 ppm to 1800 ppm. The method for suppressing foaming in a carbonated beverage includes adjusting a concentration of glycerin in a carbonated beverage to 120 ppm to 1800 ppm.

3 Claims, 1 Drawing Sheet

(56) References Cited

U.S. PATENT DOCUMENTS

| | | | |
|---|---|---|---|
| 2017/0215458 | A1 | 8/2017 | Urai et al. |
| 2017/0303566 | A1 | 10/2017 | Urai et al. |

FOREIGN PATENT DOCUMENTS

| | | | | |
|---|---|---|---|---|
| JP | 2001-346557 | A | | 12/2001 |
| JP | 2013-46642 | A | | 3/2013 |
| JP | 2014064488 | A | * | 4/2014 |
| JP | 2014-226073 | A | | 12/2014 |
| JP | 2016-116515 | A | | 6/2016 |
| JP | 6790295 | B1 | | 11/2020 |
| WO | 2015/033118 | A1 | | 3/2015 |
| WO | 2016/052659 | A1 | | 4/2016 |

OTHER PUBLICATIONS

Written Opinion (PCT/ISA/237) dated Oct. 3, 2022, issued by International Searching Authority for International Application No. PCT/JP2022/029387.

* cited by examiner

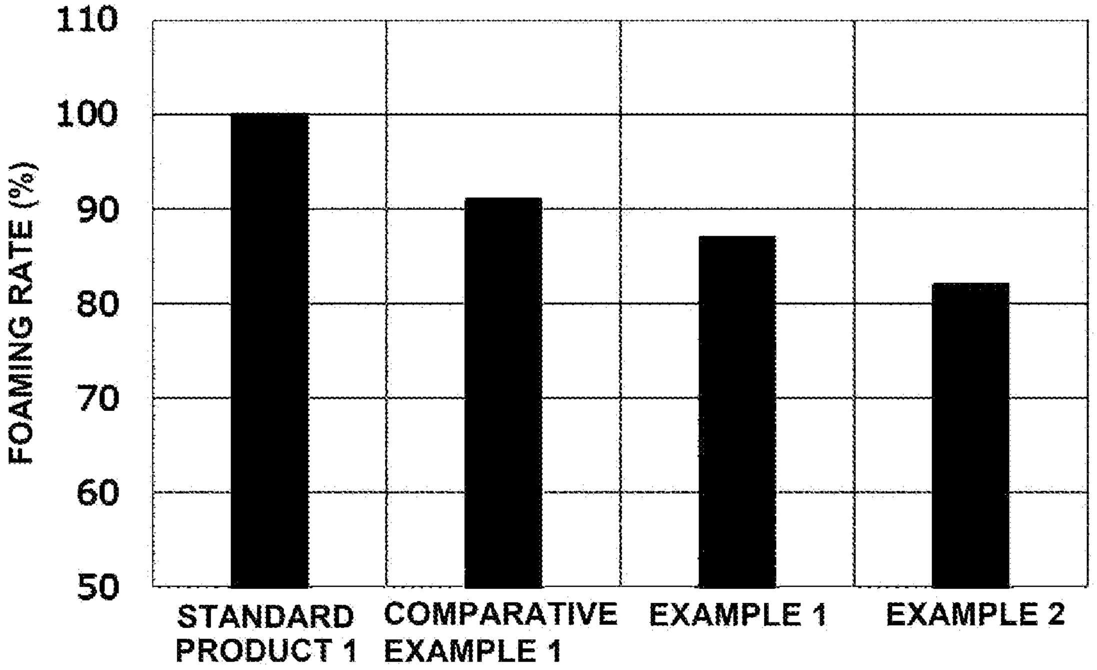
110
100
90
80
70
60
50
FOAMING RATE (%)
STANDARD PRODUCT 1
COMPARATIVE EXAMPLE 1
EXAMPLE 1
EXAMPLE 2

METHOD FOR SUPPRESSING FOAMING IN CARBONATED BEVERAGE, METHOD FOR PRODUCING CARBONATED BEVERAGE, CARBONATED BEVERAGE WITH SUPPRESSED FOAMING

CROSS-REFERENCE TO RELATED APPLICATIONS

This application is a National Phase Entry of PCT International Application No. PCT/JP2022/029387, filed on Jul. 29, 2022, which claims priority to Japanese Patent Application No. 2021-127898 filed on Aug. 4, 2021, the contents of all of which are incorporated herein by reference in their entirety.

TECHNICAL FIELD

The present invention relates to a method for suppressing foaming in a carbonated beverage, a method for producing a carbonated beverage, and a carbonated beverage with suppressed foaming.

BACKGROUND ART

Carbonated beverages are often drunk for the unique stimulation in the oral cavity caused by the carbon dioxide gas therein, and are popular in new lifestyles currently because of refreshing one's pent-up feelings and making one feel positive. In recent years, there has been an increase in the number of consumers seeking healthy refreshment through the stimulation of carbonated water, and many products featuring strong carbonation, which have a higher amount of dissolved carbon dioxide gas than regular carbonated water, have been released.

On the other hand, the carbonated beverages contain the dissolved carbon dioxide gas in a supersaturated state, which can cause troubles such as carbonated beverages spilling out when filling containers such as a plastic bottle or when consumers open the bottle. Therefore, for example, Patent Literature 1 discloses a technique for suppressing spillage during filling by blending a polysaccharide of three or more saccharides. In addition, Patent Literature 2 discloses an antifoaming agent for beverages in which a food emulsifier is used, which is less likely to cause oil floating or influence flavors, and which has excellent antifoaming performance.

CITATION LIST

Patent Literature

Patent Literature 1: JP2014-226073A
Patent Literature 2: JP2016-116515A

SUMMARY OF INVENTION

Technical Problem

However, the technique disclosed in Patent Literature 1 does not focus on flavors, and depending on the concentration added, the amount to be used may be limited in carbonated beverages characterized by being sugar-free. In addition, since the technique disclosed in Patent Literature 2 uses an emulsifier, it may cause turbidity depending on the concentration added, and the amount to be used may be limited in transparent carbonated beverages.

Solution to Problem

Therefore, the present inventors have focused on a solvent that accounts for a large proportion in a flavor composition and has the role of dissolving a flavor while intensively studying on providing a carbonated beverage that suppresses spillage of the carbonated beverage during production. Thus, the present invention has been completed. More specifically, the present invention relates to the following <1> to <7>.

<1> A carbonated beverage containing:

glycerin in an amount of 120 ppm to 1800 ppm.

<2> The carbonated beverage according to the above <1>, further containing:

a flavor composition in which a proportion of the glycerin is 60% to 90% on a mass basis.

<3> A method for producing a carbonated beverage, containing:

adjusting a concentration of glycerin in the carbonated beverage to 120 ppm to 1800 ppm.

<4> The method for producing a carbonated beverage according to the above <3>, further containing:

using a flavor composition in which a proportion of the glycerin is 60% to 90% on a mass basis.

<5> A method for suppressing foaming in a carbonated beverage, containing:

adjusting a concentration of glycerin in the carbonated beverage to 120 ppm to 1800 ppm.

<6> The method for suppressing foaming in a carbonated beverage according to the above <5>, further containing:

using a flavor composition in which a proportion of the glycerin is 60% to 90% on a mass basis.

<7> A carbonated beverage flavor composition for suppressing foaming in a carbonated beverage, which is used in the method according to the above <3> or <5>, in which a proportion of the glycerin is 60% to 90% on a mass basis.

Advantageous Effects of Invention

According to the present invention, spillage of a carbonated beverage during filling can be suppressed.

BRIEF DESCRIPTION OF DRAWINGS

The FIGURE is a diagram showing evaluation results regarding a foaming suppression test in Examples.

DESCRIPTION OF EMBODIMENTS

Hereinafter, the present invention will be described in detail. In the present description, proportions (percentages, parts, etc.) on a weight basis are the same as proportions (percentages, parts, etc.) on a mass basis. In the present description, ppm means 0.001 mg/g.

A carbonated beverage according to the present invention contains glycerin in an amount of 120 ppm to 1800 ppm. When the content of glycerin in the carbonated beverage is within the above range, a foaming suppressing effect in the carbonated beverage can be obtained.

The carbonated beverage according to the present invention is preferably a carbonated beverage with suppressed foaming. That is, the carbonated beverage according to the present invention is preferably a carbonated beverage with suppressed foaming in which the concentration of glycerin is adjusted to 120 ppm to 1800 ppm, and is particularly preferably a carbonated beverage with suppressed foaming that occurs during production, such as when filling containers with carbonated beverages.

In the present description, "foaming" means formation of foam in a carbonated beverage.

The concentration of glycerin in the carbonated beverage can be measured by a liquid chromatogram mass spectrometer.

The proportion of glycerin in a carbonated beverage flavor composition for suppressing foaming according to the present invention is preferably 60% to 90% on a mass basis. The proportion of glycerin in the flavor composition according to the present invention is more preferably 70% to 90%, and still more preferably 80% to 90%, on a mass basis. The flavor composition according to the present invention can be used in a method for producing a carbonated beverage or a method for suppressing foaming in a carbonated beverage, which will be described later. When the content of glycerin in the flavor composition is within the above range, a foaming suppressing effect in a carbonated beverage containing the above flavor composition can be obtained. In addition to flavor components described below, the flavor composition may contain commonly used retention agents and solvents. Examples of the carbonated beverage flavor composition according to the present invention also include a flavor composition in which the proportion of glycerin is 60% to 90%.

The concentration of glycerin in the flavor composition can be measured by gas chromatograph and a gas chromatograph mass spectrometer.

The flavor composition according to the present invention is contained in the carbonated beverage in an amount of preferably 0.02% to 0.2%, and more preferably 0.02% to 0.1%, on a mass basis.

Examples of the carbonated beverage containing the flavor composition according to the present invention also include a carbonated beverage in which the proportion of glycerin in the flavor composition is 60% to 90% on a mass basis. The carbonated beverage is preferably a carbonated beverage with suppressed foaming. Examples of the carbonated beverage containing the flavor composition according to the present invention also include a carbonated beverage with suppressed foaming in which the proportion of glycerin in the flavor composition is 60% to 90%.

The carbonated beverage in the present invention can be, for example, a carbonated beverage containing only water, a flavor, and the carbon dioxide gas, or a beverage containing various carbon dioxide gases, such as a colored carbonated beverage containing a coloring agent or the like.

As the flavor in the carbonated beverage, common flavors such as natural flavors, synthetic flavors, and mixtures of natural flavors and synthetic flavors can be used. For example, a fruit flavor, a yogurt flavor, a ramune flavor, or a mixture thereof can be used. Examples of the fruit flavor include: citrus fruits (oranges, lemons, grapefruits, citrus unshiu, Buntan, Natsumikan, Hassaku, limes, citrons, yuzu, sweeties, sudachi, kabosu, kumquats, etc.); berries (for example, rubus such as raspberries, blackberries, loganberries, young berries, boysenberries, tayberries, cloudberries, salmonberries, arctic raspberries, and mayberries, bilberries such as blueberries, cranberries, and cowberries, currants such as gooseberries, red currants, and black currants, berries, mulberries, strawberries, wolfberries, elderberries, etc.); pears (pear, Japanese pear, Chinese pear, etc.); apple; grape; pineapple; fig; melon; mango; pomegranate; passion fruit; lychee; banana; peach; watermelon; tomato; papaya; guava; and loquat. These flavors may be used alone or in combination of two or more thereof. From the viewpoint of efficiently obtaining the foaming suppressing effect in the carbonated beverage, it is preferable to use a natural flavor such as citrus fruits or a flavor that is abundantly contained in citrus fruits. The above flavor may be contained in the flavor composition.

When the carbonated beverage, the flavor composition or the method according to the present invention is used in combination with a carbonated beverage containing a flavor component in an amount of 1 ppm to 160 ppm with a Log P of 2.8 to 8.0 calculated by "United States Environmental Protection Agency ver. 4.11" or the like, a further foaming suppressing effect can be obtained.

Specific examples of the above flavor component with a Log P of 2.8 to 8.0 include benzyl benzoate, isoamyl benzoate, benzyl phenyl acetate, benzyl salicylate, octanol, nonanol, decanol, and menthyl 3-hydroxybutyrate. Benzyl benzoate, menthyl 3-hydroxybutyrate, ethyl myristate, methyl myristate, and ethyl palmitate are preferred in that they have little influence on flavor tone. These flavor components may be used alone or in combination of two or more thereof.

Examples of a sweetener contained in the carbonated beverage include a fructose corn syrup, sugar (including sucrose and granulated sugar), fructose, high fructose corn syrup, glucose, oligosaccharide, lactose, honey, starch syrup, sugar alcohol, and a high-intensity sweetener. Examples of the high-intensity sweetener include aspartame, acesulfame potassium, xylitol, glycyrrhizin, disodium glycyrrhizinate, saccharin, saccharin calcium, saccharin sodium, sucralose, alitame, neotame, arabinose, a licorice extract, xylose, *stevia*, thaumatin, a licorice extract, rhamnose, and ribose. These sweeteners may be used alone or in combination of two or more thereof.

In the present invention, it is preferable that the carbonated beverage contains substantially no fruit juice, since the foaming suppressing effect can be efficiently obtained.

The gas volume (carbon dioxide gas pressure) of the carbonated beverage may be adjusted as appropriate depending on the purpose. According to the present invention, it is possible to suppress foaming at a high gas volume of 3.0 to 5.0. However, the present invention is not particularly limited thereto, and for example, the gas volume of the carbonated beverage may be set to a low gas volume such as 0.1 to 3.0.

A known method can be used for press-injecting the carbon dioxide gas. The gas volume in the carbonated beverage can be measured by a known method. For example, it can be measured using a commercially available measuring device (such as gas volume measuring device GVA-500 manufactured by KYOTO ELECTRONICS MANUFACTURING CO., LTD.).

Note that, the gas volume represents the ratio of the volume of the carbon dioxide gas dissolved in the carbonated beverage to the volume of the entire carbonated beverage under standard conditions (1 atm, 0 °C.).

In addition to the flavor and the sweetener, the carbonated beverage according to the present invention may contain other components to the extent that the effects of the present invention are not impaired. Other components can be added as an additive. As such an additive, for example, a colorant, an antioxidant, a seasoning, a fortifying agent such as vitamins and minerals, a pH adjuster, an emulsifier, a stabilizer, dietary fibers, or dextrin can be used. These components may be used alone or in combination of two or more thereof.

The method for suppressing foaming in a carbonated beverage according to the present invention include a step of adjusting a concentration of glycerin in a carbonated beverage to 120 ppm to 1800 ppm. In addition, a method for suppressing foaming in a carbonated beverage containing a flavor composition according to the present invention include a step of using a flavor composition in which a proportion of glycerin is 60% to 90% on a mass basis. Examples of the method according to the present invention also include a method for suppressing foaming in a carbonated beverage, which uses a flavor composition in which a proportion of glycerin is 60% to 90% in a carbonated beverage containing the perfume composition.

According to such a method for suppressing foaming in a carbonated beverage, the foaming in the carbonated beverage can be effectively suppressed, and in particular, the foaming in the carbonated beverage that occurs during production, such as when filling containers with carbonated beverages, can be effectively suppressed.

The method for producing a carbonated beverage according to the present invention include a step of adjusting a concentration of glycerin in a carbonated beverage to 120 ppm to 1800 ppm. In addition, a method for producing a carbonated beverage containing a flavor composition according to the present invention include a step of using a flavor composition in which a proportion of glycerin is 60% to 90% on a mass basis. The produced carbonated beverage is preferably a carbonated beverage with suppressed foaming. Examples of the method according to the present invention also include a method for producing a carbonated beverage with suppressed foaming in which the proportion of glycerin in the perfume composition is 60% to 90% in a carbonated beverage containing the flavor composition.

According to such a method for producing a carbonated beverage, the foaming can be effectively suppressed, and in particular, the foaming in the carbonated beverage that occurs during production, such as when filling containers with carbonated beverages, can be effectively suppressed.

Examples

Hereinafter, the present invention will be described in more detail with reference to Examples, but the present invention is not limited thereto.

The following grape flavor mixture (Reference Product 1) was prepared. Table 1 shows the blending formulation of Reference Product 1.

TABLE 1

| Name of flavor compound | Weight ratio |
|---|---|
| Ethyl acetate | 16 |
| Linalool | 4 |
| Ethyl butyrate | 10 |
| Acetic acid | 1 |
| Ethyl isovalerate | 10 |
| Methyl anthranilate | 50 |
| Ethyl caproate | 2 |
| Vanillin | 2 |
| Isoamyl alcohol | 4 |
| Maltol | 1 |
| Total | 100 |

As shown in Table 2 below, a flavor composition was prepared by mixing Reference Product 1, water, and ethanol and glycerin that can be used as solvents. A sample was prepared by adding a flavor composition to a commercially available plain strongly carbonated water (gas volume: 5.0) cooled to 5 °C or lower such that the amount was 0.02% on a mass basis based on the total amount of the carbonated beverage. Values of Reference Product 1, water, ethanol, and glycerin in Table 2 indicate weight ratios of each component in the flavor compositions contained in Standard Product 1, Comparative Example 1, and Examples 1 and 2.

TABLE 2

| | Standard Product 1 | Comparative Example 1 | Example 1 | Example 2 |
|---|---|---|---|---|
| Reference Product 1 | 1 | 1 | 1 | 1 |
| Water | 9 | 9 | 9 | 9 |
| Ethanol | 90 | 40 | 30 | 10 |
| Glycerin | 0 | 50 | 60 | 80 |
| Total | 100 | 100 | 100 | 100 |
| Concentration (ppm) of glycerin in carbonated beverage | 0 | 100 | 120 | 160 |

(Foaming Property Evaluation Method) A funnel (diameter: 150 mm) was installed such that the tip thereof was 5 mm above a mouth portion of a 1 L measuring cylinder (height: 420 mm, outer diameter: 7 cm). 10 seconds after pouring 500 mL of the sample into the funnel, the sample was poured at a rate of 10 L/min with care such that it fell into the center of the measuring cylinder, and the highest height (maximum total height) reached before bubbles disappeared was measured. From the obtained results, a foaming rate was calculated based on the following equation.

Foaming rate (%)=(maximum total height of sample for which foaming rate is calculated)×100/(maximum total height of Standard Product 1)

Note that, as a criterion for determining the foaming suppressing effect, a foaming rate of 90% or less was determined to have a foaming suppressing effect.

Standard Product 1 is a carbonated beverage containing a flavor composition using only ethanol as a solvent. On the other hand, Comparative Example 1 and Examples 1 and 2 use ethanol and glycerin as solvents, and are carbonated beverages containing flavor compositions with different proportions of these solvents.

Table 3 and FIGURE show the foaming rate (%) calculated by performing a foaming property evaluation test using these formulations.

TABLE 3

| Standard Product 1 | Comparative Example 1 | Example 1 | Example 2 |
|---|---|---|---|
| 100 | 91 | 87 | 82 |

Carbonated beverages with glycerin adjusted to less than 120 ppm (Standard Product 1, Comparative Example 1) have no foaming suppressing effect, while the foaming suppressing effect is confirmed in carbonated beverages containing glycerin in an amount of 120 ppm or more (Examples 1 and 2). Therefore, the present method is shown to be a useful method for solving the problem.

Although the present invention has been described in detail with reference to specific embodiments, it will be apparent to those skilled in the art that various changes and modifications can be made without departing from the spirit and scope of the present invention. Note that, this application is based on a Japanese patent application (Japanese Patent Application No. 2021-127898) filed on Aug. 4, 2021, which is incorporated by reference in its entirety. In additional, all references cited herein are incorporated in their entirety.

The invention claimed is:

1. A method for suppressing foaming in a carbonated beverage, comprising:

adjusting a concentration of glycerin in the carbonated beverage to 120 ppm to 1800 ppm.

2. The method for suppressing foaming in a carbonated beverage according to claim 1, further comprising:

using a flavor composition in which a proportion of the glycerin is 60% to 90% on a mass basis.

3. The method according to claim 1, wherein the carbonated beverage has a foaming rate of 90% or less, the foaming rate being a ratio of a maximum foam height of the carbonated beverage to a maximum foam height of a reference carbonated beverage that is identical except that its flavor composition uses only ethanol as a solvent.

* * * * *